US009839830B1

(12) United States Patent
Miller

(10) Patent No.: US 9,839,830 B1
(45) Date of Patent: Dec. 12, 2017

(54) AIDING A SWIMMER IN MAINTAINING A DESIRED BEARING

(71) Applicant: PNI Sensor Corporation, Santa Rosa, CA (US)

(72) Inventor: Joseph F. Miller, Santa Rosa, CA (US)

(73) Assignee: PNI Sensor Corporation, Santa Rosa, CA (US)

( * ) Notice: Subject to any disclaimer, the term of this patent is extended or adjusted under 35 U.S.C. 154(b) by 0 days.

(21) Appl. No.: 15/179,873

(22) Filed: Jun. 10, 2016

(51) Int. Cl.
*G08B 23/00* (2006.01)
*A63B 71/06* (2006.01)
*A63B 33/00* (2006.01)
*A63B 24/00* (2006.01)

(52) U.S. Cl.
CPC ...... *A63B 71/0622* (2013.01); *A63B 24/0021* (2013.01); *A63B 24/0062* (2013.01); *A63B 33/00* (2013.01); *A63B 2024/0025* (2013.01); *A63B 2071/0625* (2013.01); *A63B 2071/0666* (2013.01); *A63B 2071/0694* (2013.01)

(58) Field of Classification Search
CPC ......... A61B 5/11; A61B 5/681; A61B 5/6804; A63F 13/06; A63F 13/04; G06F 21/6245
USPC ..... 340/573.1, 573.6, 573.7, 539.13; 346/31, 346/37; 345/158; 434/254
See application file for complete search history.

(56) References Cited

U.S. PATENT DOCUMENTS

| 2006/0214805 | A1* | 9/2006 | Boujon | E04H 4/065 340/573.1 |
| 2010/0056876 | A1 | 3/2010 | Ellis et al. | |
| 2011/0181510 | A1* | 7/2011 | Hakala | G06F 3/017 345/158 |
| 2011/0285620 | A1* | 11/2011 | Latta | G06F 3/017 345/156 |
| 2013/0196759 | A1* | 8/2013 | Kim | A63F 13/06 463/31 |
| 2013/0225296 | A1* | 8/2013 | Kim | A63F 13/04 463/37 |
| 2013/0274587 | A1* | 10/2013 | Coza | A61B 5/6804 600/409 |
| 2013/0274904 | A1* | 10/2013 | Coza | G06F 3/011 700/91 |
| 2014/0087685 | A1 | 3/2014 | Kellond et al. | |
| 2014/0180449 | A1* | 6/2014 | Sung | A63B 71/0622 700/91 |
| 2014/0212858 | A1* | 7/2014 | Lewin | A63B 69/12 434/254 |
| 2014/0266160 | A1* | 9/2014 | Coza | G01B 7/003 324/207.11 |

(Continued)

*Primary Examiner* — Hoi Lau
(74) *Attorney, Agent, or Firm* — Brian R. Short

(57) ABSTRACT

Apparatuses, methods and systems for a swim apparatus are disclosed. One embodiment of the swim apparatus includes one or more sensors sensing motion of a swimmer, a direction indicator for indicating a direction to the swimmer, and a controller. The controller is operative to receive sense signals from the one or more sensors, and identify a desired bearing of the swimmer comprising identifying one or more natural gesture motions of the swimmer from the received sense signals that indicate the desired bearing of the swimmer. Further, the controller is operative to identify an actual heading of the swimmer based on the received sense signals, calculate a heading offset based on the desired bearing of the swimmer and the actual heading of the swimmer, and provide the heading offset to the direction indicator.

18 Claims, 4 Drawing Sheets

(56) References Cited

U.S. PATENT DOCUMENTS

| | | |
|---|---|---|
| 2014/0288438 A1 | 9/2014 | Venkatraman et al. |
| 2015/0063081 A1 | 3/2015 | Sharples |
| 2015/0074742 A1* | 3/2015 | Kohno ................ G06F 21/6245 726/1 |
| 2015/0104064 A1 | 4/2015 | Guissin et al. |
| 2015/0122018 A1 | 5/2015 | Yuen |
| 2015/0201854 A1 | 7/2015 | Hong et al. |
| 2015/0248844 A1 | 9/2015 | Ellis et al. |
| 2015/0290500 A1* | 10/2015 | Clisson ................ A63B 69/14 434/254 |
| 2016/0144234 A1* | 5/2016 | Yang ................ A61B 5/11 434/254 |
| 2016/0217348 A1* | 7/2016 | Cho ................ G06T 1/0007 |

* cited by examiner

AIDING A SWIMMER IN MAINTAINING A DESIRED BEARING

FIELD OF THE EMBODIMENTS

The described embodiments relate generally to a swim device. More particularly, the described embodiments relate to apparatuses, methods and systems for a swim device that monitors a swimmer's direction and provides real-time directional feedback to the swimmer.

BACKGROUND

Maintaining ones direction in open water swimming can be challenging because of environments effects, such as, wind and water currents. For example, in a swimming race taking place in open water, such as, the ocean or lakes, it can be very difficult for a swimmer to both concentrate on the act of swimming and maintain a consistent proper direction. Generally, the swimmer must continuously look up and check his or her direction, which takes away from the act of swimming.

One solution includes providing the swimmer with a wrist-worn display that provides direction information. However, it is inconvenient and undesirable for the swimmer who is actively using their arms to propel them through water, to stop moving their arms to read the wrist-worn display.

It is desirable to have apparatuses, methods, and systems for providing a swimmer with real-time directional information that does not detract the swimmer from swimming.

SUMMARY

An embodiment includes a swim apparatus. The swim apparatus includes one or more sensors sensing motion of a swimmer, a direction indicator for indicating a direction to the swimmer, and a controller. The controller is operative to receive sense signals from the one or more sensors, and identify a desired bearing of the swimmer comprising identifying one or more natural gesture motions of the swimmer from the received sense signals that indicate the desired bearing of the swimmer. Further, the controller is operative to identify an actual heading of the swimmer based on the received sense signals, calculate a heading offset based on the desired bearing of the swimmer and the actual heading of the swimmer, and provide the heading offset to the direction indicator.

Another embodiment includes a swim method. The swim method includes receiving sense signals from the one or more sensors associated with a swimmer, and identifying a desired bearing of the swimmer comprising identifying one or more natural gesture motions of the swimmer from the received sense signals that indicate the desired bearing of the swimmer. Further, the method includes identifying an actual heading of the swimmer based on the received sense signals, calculating a heading offset based on the desired bearing of the swimmer and the actual heading of the swimmer, and providing the heading offset to a direction indicator that indicates a direction to the swimmer.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide for apparatuses, methods, and systems for determining a desired bearing of a swimmer, and then providing directional feedback to the swimmer. At least some embodiments advantageously determine the desired bearing of the swimmer while the swimmer is performing natural swim motions. That is, at least some of the described embodiments do not require the swimmer to perform a non-natural swim motion in order to determine the desired bearing of the swimmer. As such, the focus of the swimmer on performing actual swim motions is minimally deterred.

At least some embodiments of the swimming aid device 110 perform a variety of functions that enhance a swimmers training and improve the swimmer's performance during a race or swim trial. For at least some embodiments, the swimming aid device 110 uses motion sensors in conjunction with a microprocessor to sense a swimmer's head positions and movements. The motion and orientation information is used to compute a variety of data useful to a swimmer. For at least some embodiments, the swimming aid device 110 includes a speaker/earphone, indicator lights or display to inform the swimmer. For at least some embodiments, the feedback signals do not interfere with a swimmer's regular movements, disrupt a swimmer's rhythm, or distract the vision of the swimmer. For at least some embodiments, the swimming aid device 110 is designed to be securely attached to the swimmer's existing goggles such as to the strap on the side of the head.

Figure 1:
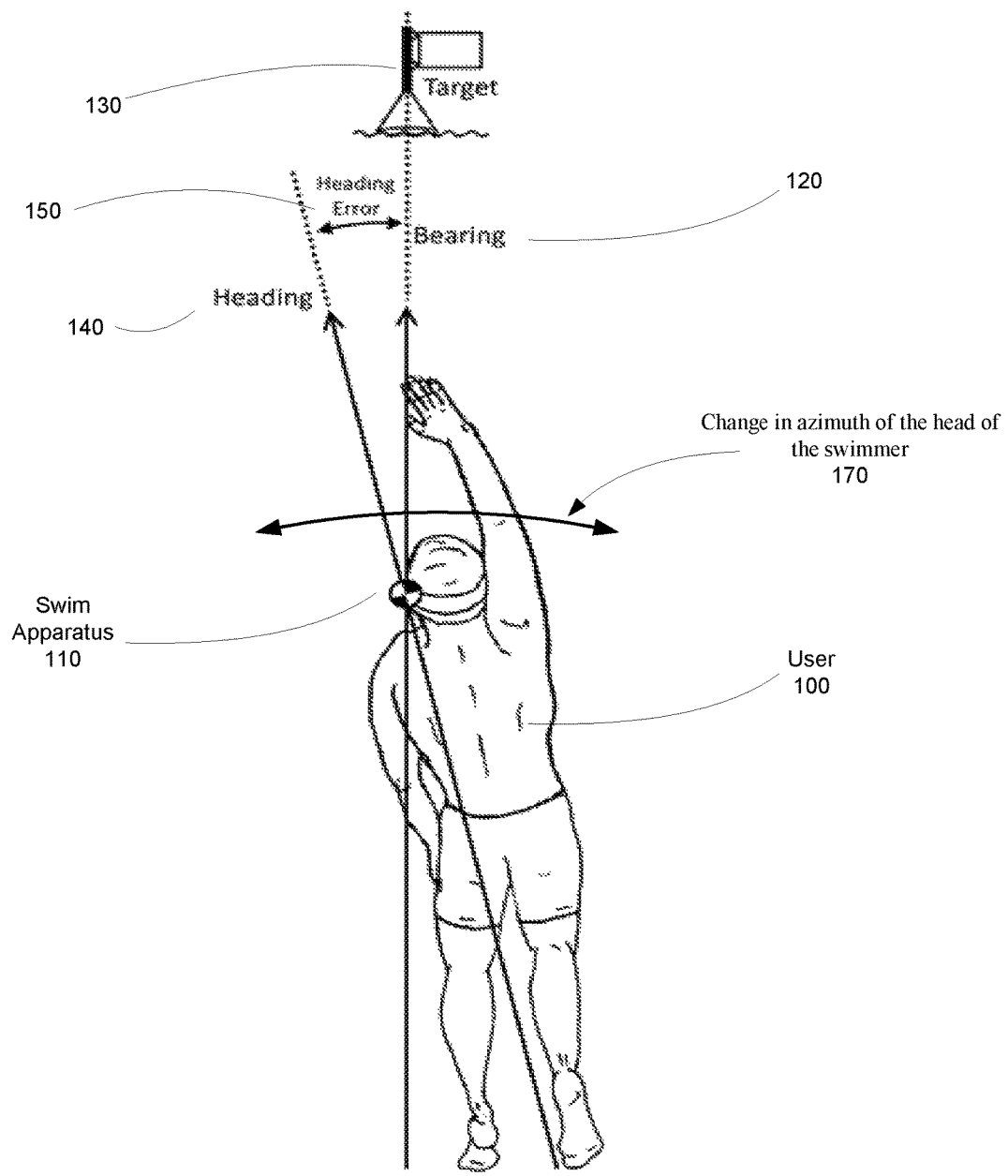
FIG. 1 shows a swimmer (user) using a swimming aid device that provides the swimmer with real-time directional information, according to an embodiment.

FIG. 1 shows a swimmer (user) 100 using a swimming aid device 110 that provides the swimmer 100 with real-time directional information, according to an embodiment. During steady state swimming of the swimmer 100, the swimmer 100 will generally have a desired bearing 120 directed towards, for example, a target 130. The desired bearing 120 is the direction in which the swimmer intends or desires to be directed. However, due to environmental or other factors (such as, the swimmer drifting off course due to an unbalanced swim stroke and/or posture of the swimmer), the swimmer will have a heading 140 which is the actual direction the swimmer is directed. That is, the swimmer 100 may initial start out directed in the desired bearing 120, but drifts into the heading 140. If the swimmer is, for example, racing, the drift to the heading 140 is clearly undesirable because the swimmer will have to swim an extra distance to compensate for the deviation from the desired bearing 120.

For at least some embodiments, the swimming aid device 110 is attached to the swimmer 100. The swimming aid device 110 receives inputs from the swimmer 100, determines the desired bearing 120 of the swimmer, determines the heading 140 of the swimmer, determines a heading error 150, and then feeds the heading error 150 back to the swimmer 100 so that the swimmer 100 is aware of the heading error 150. That is, the swimming aid device 110 includes inputs and generates an output. As describes, for at least some embodiments, the input is determined using natural motions of the swimmer, thereby minimizing impact on motion of the swimmer. The output of provided to the swimmer to allow the swimmer to correct his/her direction to the desired bearing.

Outputs

Conveying output information (for example, the heading error) to the swimmer can be difficult. It is inconvenient and undesirable for a swimmer, who is actively using their arms to propel them through water, to stop moving their arms to read a wrist-worn display. For at least some embodiments, a heads-up, in-goggle or projected display is utilized to provide information to the swimmer. Additionally, or alternatively, audible tones from a speaker or earphone can enhance the communication to the swimmer. Another method to convey information to swimmer is by audio annunciation of spoken words. Such a signal can be transmitted to a speaker or earphone. A bone conduction speaker that vibrates the jaw bone with a waterproof encapsulated speaker to conduct audio waves to the inner ear is a proven approach for transmitting sound underwater.

Inputs

There are several possible ways for the swimmer 100 to communicate to the swimming aid device 110. One method is through a set of switches (mechanical, optical or magnetic) or the use of an accelerometer to sense the user tapping the device. For at least some embodiments, inputs are communicated to the swimming aid device 110 through a motion-based sensor system that recognizes head gestures and head orientation. For in-pool training purposes, accelerometer based single or multiple taps can be detected. The axis, or direction, that the tap is applied as well as the orientation of the device at the time the taps are applied can be used as to further differentiate a variety of input commands. Examples of features that can make use of tap signatures include increasing and decreasing device setting, or to turn on or off options. Taps of the swimming aid device 110 can also be used to navigate through the settings or options menu structure of the swimming aid device 110, or to record laps manually by the swimmer or initiate unit wake up or to put it to sleep.

Navigation

At least some embodiments of the swimming aid device 110 includes navigation features that help the swimmer 100 stay in a straight line towards their target 130 destination, or bearing 120. For at least some embodiments, these navigation features reduce the number of times the swimmer 100 has to sight for landmarks to maintain their bearing. These features are particularly useful for open water swimming. The benefits are to save time in competitive events by staying on a straight course to the next designated marker and reducing the number of times the swimmer 100 has to sight for landmarks, increasing efficiency and reducing swim time. Sighting for landmarks require the swimmer to lift their head out of the water, reducing their momentum and averting their posture from ideal form and balance affecting their overall speed.

For at least some embodiments, the swimming aid device 110 automatically remembers a bearing direction based on head gestures of the swimmer. One such gesture is the swimmer 100 raising their head (to near vertical position) such as typically done to sight a landmark. When the swimmer's head drops back down to swimming position (back to horizontal) the swimming aid device 110 then remembers the heading direction that the swimmer 100 was looking towards and uses that as the new bearing. Any number of programmable head gesture can be sensed by the sensors and interpreted by the microprocessor of the swimming aid device 110. Head gestures are preferable over anything involving the use of ones hands, such as tapping on the device in a particular manner, which can interrupt the swimmers momentum and balance.

For at least some embodiments, the output of the swimming aid device 110 includes providing the target bearing to the swimmer 100 with a line that the swimmer 100 can track continuously. One embodiment includes a simulation to the swimmer 100 of the lane lines of a swimming pool, which typically have a black line in the center of each lane. This can be achieved, for example, by means of light projection or direct display. One example of a display is an array of LED or LCD indicators mounted to the swimmers goggle lens that move with the swimmers head, keeping them continuously updated with the direction of their desired target. Even as the swimmer 100 rolls their head to breath, the array keeps them updated as to the location of the imaginary swim lane position (the target bearing) relative to their current heading. This is important as most swimmers not only roll their heads throughout their swim stoke-cycle but the heading (yaw angle) there head also dithers and cycles. Having a continuous display pointing towards the target direction simulates swimming in a lap pool with lane markings, which is intuitive and provides the least distraction keeping the swimmer 100 focused on their performance and strategy in competitions.

For at least some embodiments, the desired bearing is reported to the swimmer continuously during their swim even as their body positions rolls as is typical in the most common freestyle swimming method. Other options available for reporting heading error is to use varying tone pitches where the tone is proportional to the error. Another option is to annunciate the heading error as a spoken value through the bone conduction speaker at regular intervals or at zero (level) roll position. For at least some embodiments, the bearing reported to the swimmer is enhanced, to improve the swimmer's heading accuracy, by including compensation for slow off coarse drift trends by adding to the bearing a percentage of the swimmer' time-integral heading error.

As described, at least some embodiments of the swimming aid device 110 includes a swim apparatus, wherein the swim apparatus includes one or more sensors sensing motion of a swimmer, a direction indicator for indicating a direction to the swimmer, and a controller. The controller is operative to receive sense signals from the one or more sensors, identify a desired bearing of the swimmer, including identifying one or more natural gesture motions of the swimmer from the received sense signals that indicate the desired bearing of the swimmer, identify an actual heading of the swimmer based on the received sense signals, calculate a heading offset based on the desired bearing of the swimmer and the actual heading of the swimmer, and provide the heading offset to the direction indicator. For at least some embodiments, identifying the desired bearing of the swimmer comprises sensing motion gestures of the swimmer that are repeatedly performed by the swimmer when the swimmer is determining the desired bearing.

For an embodiment, identifying one or more natural gesture motions of the swimmer from the received sense signals that indicate the desired bearing of the swimmer includes sensing a head of the swimmer has been raised more than a threshold, indicating that at least one eye of the swimmer has been raised out of water the swimmer is swimming in, sensing the head of the swimmer has rotated towards a position directed towards the desired heading of the swimmer, and sensing the head of the swimmer has been lowered back down by the threshold, indicating the head of the swimmer is directed towards the desired heading.

For an embodiment, identifying one or more natural gesture motions of the swimmer from the received sense signals that indicate the desired bearing of the swimmer includes sensing a head of the swimmer has been raised more than a first threshold, indicating that at least one eye of the swimmer has been raised out of water the swimmer is swimming in, sensing the head of the swimmer has rotated towards a position directed towards the desired heading of the swimmer, and sensing the head of the swimmer has been lowered back down by second threshold, indicating the head of the swimmer is directed towards the desired heading. For an embodiment, the first threshold is different than the second threshold. For example, hysteresis is applied to the first and second thresholds. That is, the upward movement threshold (first threshold) has a small added offset to the threshold and the lowering motion threshold (second threshold) has a small offset subtracted from the threshold to prevent accidental trigging of the bearing storage in choppy water or jittery head movements.

Figure 2A:
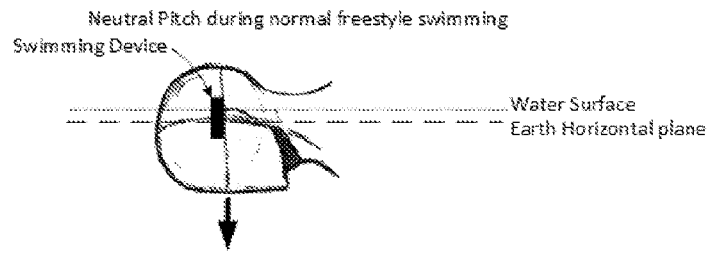
FIG. 2A shows a swimmer (user) using a swimming aid device, and depicts a position of the head of the swimmer while the swimmer is in a steady state normal swim position, according to another embodiment.

FIG. 2A shows a swimmer (user) using a swimming aid device, and depicts a position of the head of the swimmer while the swimmer is in a steady state normal swim position, according to another embodiment. As shown, the head of the swimmer is positioned for normal freestyle style swimming. While in this steady state normal swim position, the sensors of the swim device (apparatus) sense the orientation of the head of the swimmer. For example, the Earth's horizontal plane is sensed (for example, by an accelerometer and magnetic sensor) for pitch and roll references and Earth's Magnetic North direction is sensed as an absolute azimuth reference. For an embodiment, the swim device includes one or more accelerometers, one or more magnetic sensors, and/or one or more gyroscopes.

The steady state swimming motion normal swimming position can be used to determine references which can be used for sensing when the swimmer naturally raises his/her head for determining the desired bearing. The steady state position can be identified by a long string (greater than a predetermined threshold) of repeated swim-type motions. The swim motion can be sensed by one or more of the described sensors. While in the steady state swimming motion normal swimming position the horizontal plane of the Earth can be determined for an embodiment by sensing of an accelerometer (sensing one of the three axes of free space). The plane of the Earth is determined as being perpendicular to the gravitation vector as sensed by the accelerometer. Greater accuracy in determining the horizontal plane of the Earth can be achieved by increasing the number of sensors. For an embodiment, a magnetic sensor is used for determining the horizontal plane of the Earth. However, as previously stated, using multiple sensors, such as, more than one accelerometer, more than one magnetic sensor, or combinations of accelerometers, and/or magnetic sensors provides for improved sensing and determination of the horizontal plane of the Earth.

Figure 2B:
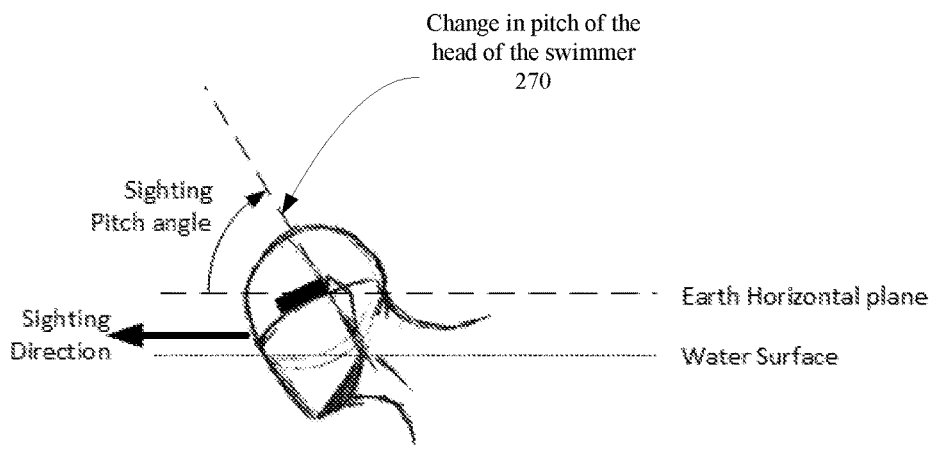
FIG. 2B shows a swimmer (user) using a swimming aid device, and depicts a change in pitch of the head of the swimmer as the head of the swimmer is raised, according to another embodiment.

FIG. 2B shows a swimmer (user) using a swimming aid device, and depicts a change in pitch of the head of the swimmer as the head of the swimmer is raised, according to another embodiment. That is, as the swimmer is swimming, a change in the pitch of the head of the swimmer is sensed which exceeds the previously described threshold or first threshold. That is, a sighting pitch angle is realized in order for the swimmer to lift his/her head and view a target of the swimmer.

When the head of the swimmer is raised, two or more accelerometers, two or more magnetic sensors, or one or more gyroscopes are used to sense the raising of the swimmer's head by more than the threshold. For example, sense signals generated by two accelerometers that sense gravity are operable to detect the raising of the swimmers head. Ideally, at least two accelerometers or at least two magnetic sensors are used to differentiate between a head turn and a head raise. Alternatively, or additionally, a gyroscope can be used for sensing the head raise.

The swimmer will naturally set a sighting direction as the swimmer rotates his/her head towards the target. The rotation of the head of the swimmer is shown in FIG. 1 (Change in azimuth of the head of the swimmer 170). For at least some embodiments, the sensing of the azimuth utilizes at least three accelerometers (one accelerometer for each axis of free space, x, y, z) and at least three magnetic sensors (x, y, z). For at least some embodiments, the sensing of the azimuth utilizes at least three magnetic sensors (x, y, z) and at least 3 gyroscopes (x, y, z). For at least some embodiments, the sensing of the azimuth utilizes at least three accelerometers (one accelerometer for each axis of free space, x, y, z), at least three magnetic sensors (x, y, z), and at least three gyroscopes (x, y, z).

Figure 2C:
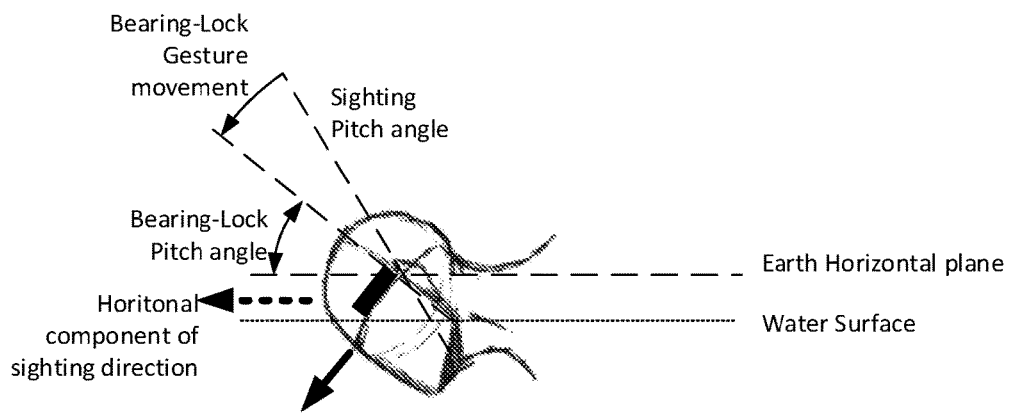
FIG. 2C shows a swimmer (user) using a swimming aid device, and depicts a change in pitch of the head of the swimmer as the head of the swimmer is lowered, according to another embodiment.

FIG. 2C shows a swimmer (user) using a swimming aid device, and depicts a change in pitch of the head of the swimmer as the head of the swimmer is lowered, according to another embodiment. Once the desired direction of the swimmer is established and the change in azimuth of the head of the swimmer is established, the head of the swimmer naturally changes its pitch to return to the steady state normal swim position. That is, as the swimmer is swimming, a change in the pitch of the head of the swimmer is sensed which exceeds the previously described threshold or second threshold as the swimmer dips his/her head back into the water. Similar to the sensing of the head raise, the head lowering can be sensed by two or more accelerometers, two or more magnetic sensors, or one or more gyroscopes. For example, sense signals generated by two accelerometers that sense gravity are operable to detect the lowering of the swimmers head. Ideally, at least two accelerometers or at least two magnetic sensors are used to differentiate between a head turn and a head lowering. Alternatively, or additionally, a gyroscope can be used for sensing the head lowering.

For at least some embodiments, identifying one or more natural gesture motions of the swimmer from the received sense signals that indicate the desired bearing of the swimmer initially includes sensing a position of a head of the swimmer relative to a horizontal plan of Earth while the swimmer is actively swimming. That is, a steady state reference position is determined, which can be used as a reference in which changes in the pitch of the head 260 of the swimmer 100 and changes in the azimuth of the head 260 of the swimmer 100 can be compared.

For an embodiment, the steady state reference includes an Earth's horizontal plane for pitch and roll references, and Earth's Magnetic North direction as an absolute azimuth reference.

Further, for at least some embodiments, identifying one or more natural gesture motions of the swimmer from the received sense signals that indicate the desired bearing of the swimmer further includes sensing a positive change in a pitch of the head 260 of the swimmer 100 relative to the horizontal plane of Earth of greater than a threshold indicating that the head of the swimmer has been lifted. The raising of the head of the swimmer indicates that the swimmer is checking his/her target to set the desired bearing.

Further, for at least some embodiments, identifying one or more natural gesture motions of the swimmer from the received sense signals that indicate the desired bearing of the swimmer further includes sensing an azimuth of a sighting direction of the head 260 of the swimmer 100 comprising sensing an azimuth angle to the sighting direction of the swimmer with respect to a local horizontal plane of Earth. That is, the swimmer will naturally direct his/her head towards the target, which allows a determination of the desired bearing. For an embodiment, the sensed (magnetic sensor) Earth's North is a reference for the azimuth. For an embodiment, and integrated gyroscope signal provides the reference for the azimuth.

Further, for at least some embodiments, identifying one or more natural gesture motions of the swimmer from the received sense signals that indicate the desired bearing of the swimmer further includes sensing a negative change in the pitch of the head of the swimmer of greater than the threshold indicating the head of the swimmer has been lowered. That is, sensing that the swimmer has lowered his/her head indicates that the swimmer has determined the desired bearing, and then lowered his/her head back into the water.

Further, for at least some embodiments, identifying one or more natural gesture motions of the swimmer from the received sense signals that indicate the desired bearing of the swimmer further includes transferring the azimuth angel of the sighting direction to set the desired bearing with the sighting direction of the head of the swimmer.

Figure 3:
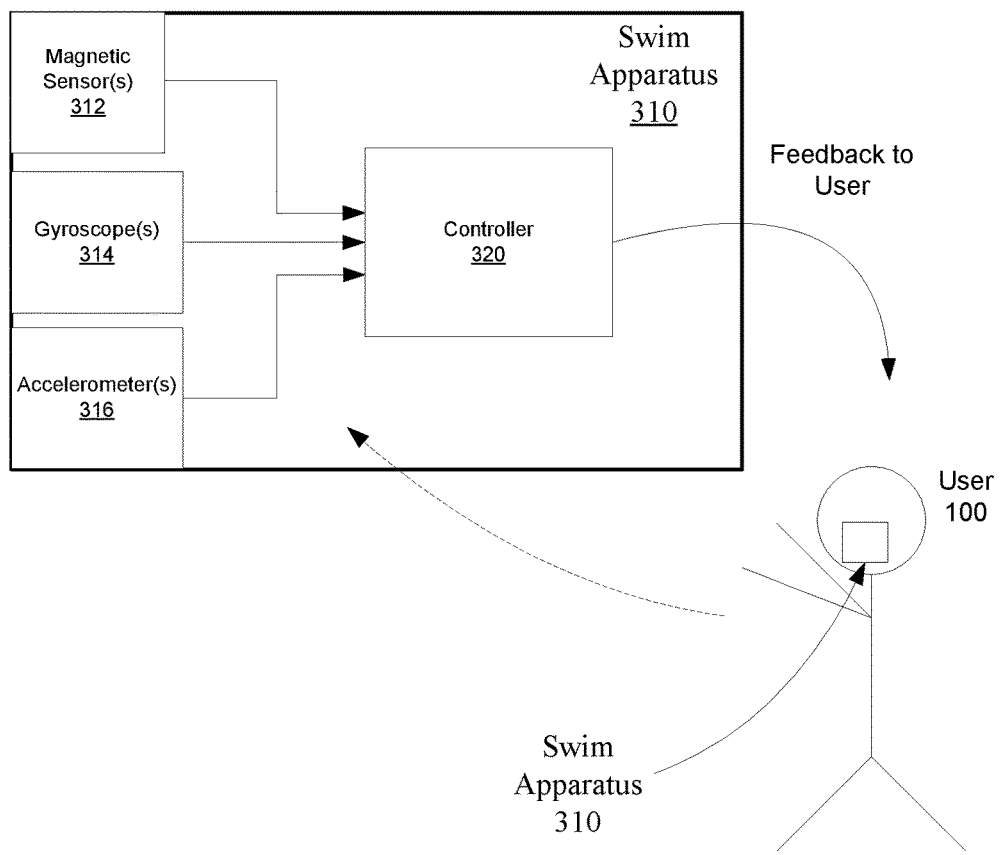
FIG. 3 shows a block diagram of a swim apparatus, according to an embodiment.

FIG. 3 shows a block diagram of a swim apparatus, according to an embodiment. For at least some embodiments, the one or more sensors include at least one of an accelerometer 316, a magnetometer 312, and/or a gyroscope 312. A controller 320 receives sense signals from one or more of the accelerometer 316, the magnetometer 312, and/or the gyroscope 312.

For at least some embodiments, the controller 320 is operative to identify a desired bearing of the swimmer. For at least some embodiments, this includes the controller 320 being operative to identify one or more natural gesture motions of the swimmer from the received sense signals that indicate the desired bearing of the swimmer. For an embodiment, this includes the controller 320 being operative to identify an actual heading of the swimmer based on the received sense signals, calculate a heading offset based on the desired bearing of the swimmer and the actual heading of the swimmer, and provide the heading offset to a direction indicator.

For at least some embodiments, the swim apparatus 310 is attached to the head of the swimmer, and senses motion and gestures of the head of the swimmer. For an embodiment, the swim apparatus is attached to swim goggles of the swimmer. For an embodiment, the swim apparatus is attached directly to the head of the swimmer.

The described embodiments of the swim device are typically attached to the head of the swimmer, however, how and where attached to the head is not important. However, for at least some embodiments, the point of attached to the swimmer's head is communicated or otherwise known by the swim device, allowing the swim device to properly orient its sensor axes and polarities with the axes of the swimmer's heading, pitch and roll.

As previously described, for an embodiment, the controller 320 identifying the desired bearing of the swimmer includes the controller sensing a head of the swimmer having been raised more than a threshold, indicating that at least one eye of the swimmer is raised out of water the swimmer is swimming in. Further, the controller 320 senses the head of the swimmer has rotated towards a position directed towards the desired heading of the swimmer. Further, the controller 320 senses the head of the swimmer has been lowered back down by the threshold, indicating the head of the swimmer is directed towards the desired heading.

As previously described, for an embodiment, the controller 320 identifying the desired bearing of the swimmer includes the controller 320 sensing a position of a head of the swimmer relative to a horizontal plan of Earth while the swimmer is actively swimming. Further, the controller 320 senses a positive change in a pitch of the head of the swimmer relative to the horizontal plane of Earth of greater than a threshold indicating that the head of the swimmer has been lifted. Further, the controller 320 senses an azimuth of a sighting direction of the head of the swimmer including sensing an azimuth angle to the sighting direction of the swimmer with respect to a local horizontal plane of Earth. Further, the controller 320 senses a negative change in the pitch of the head of the swimmer of greater than the threshold indicating the head of the swimmer has been lowered. Further, the controller 320 transfers the azimuth angel of the sighting direction to set the desired bearing with the sighting direction of the head of the swimmer.

At least some embodiments include determining the horizontal plane of Earth, and Earth's North direction includes sensing magnetic north of the Earth, sensing gravity of the Earth. Generally, an accelerometer sensor of the swim device responds to linear acceleration from movement of the object that it is attached.

For an embodiment, a 3-axis accelerometer (accelerometer sensor) of the swim device is used to detect Earth's local horizontal plane by detecting the vector for gravity. With a second sensor, and proper processing, the gravity and linear acceleration components can accurately be differentiated.

For an embodiment, the 3-axis magnetometer sensor is used to obtain Earth's magnetic North, which is used to reference the swimmer's azimuth direction (heading/bearing). Combining the measurements of the 3-axis accelerometer, a 3-axis gyroscope and a 3-axis compass in an application allows the swim device to overcome the inherent individual flaws in each of these motion sensors with a 9-axis "sensor fusion" solution. Electromagnetic interference that can degrade a magnetometer compass measurements can be compensated by the gyroscope, and the gyroscope itself, which suffers from drift over time, can be corrected by the magnetometer. The accelerometer will need boost (aid) from the other two sensors to deterministically separate gravity from linear accelerations.

For at least some embodiments, the controller is further operative to determine a level of choppiness of water the swimmer is swimming in, and adaptively adjusting the threshold based on the determined level of choppiness.

The heading offset is presented to the swimmer in at least one of various possible ways. As previously described, for at least some embodiments, the output (heading offset) of the swimming aid device 110 includes providing the target bearing to the swimmer 100 with a line that the swimmer 100 can track continuously. One embodiment includes a simulation to the swimmer 100 of the lane lines of a swimming pool, which typically have a black line in the center of each lane. This can be achieved, for example, by means of light projection or direct display. One example of a display is an array of LED or LCD indicators mounted to the swimmers goggle lens that move with the swimmers head, keeping them continuously updated with the direction of their desired target. Even as the swimmer 100 rolls their head to breath, the array keeps them updated as to the location of the imaginary swim lane position (the target bearing) relative to their current heading. This is important as most swimmers not only roll their heads throughout their swim stoke-cycle but the heading (yaw angle) there head also dithers and cycles. Having a continuous display pointing towards the target direction simulates swimming in a lap pool with lane markings, which is intuitive and provides the least distraction keeping the swimmer 100 focused on their performance and strategy in competitions.

Figure 4:
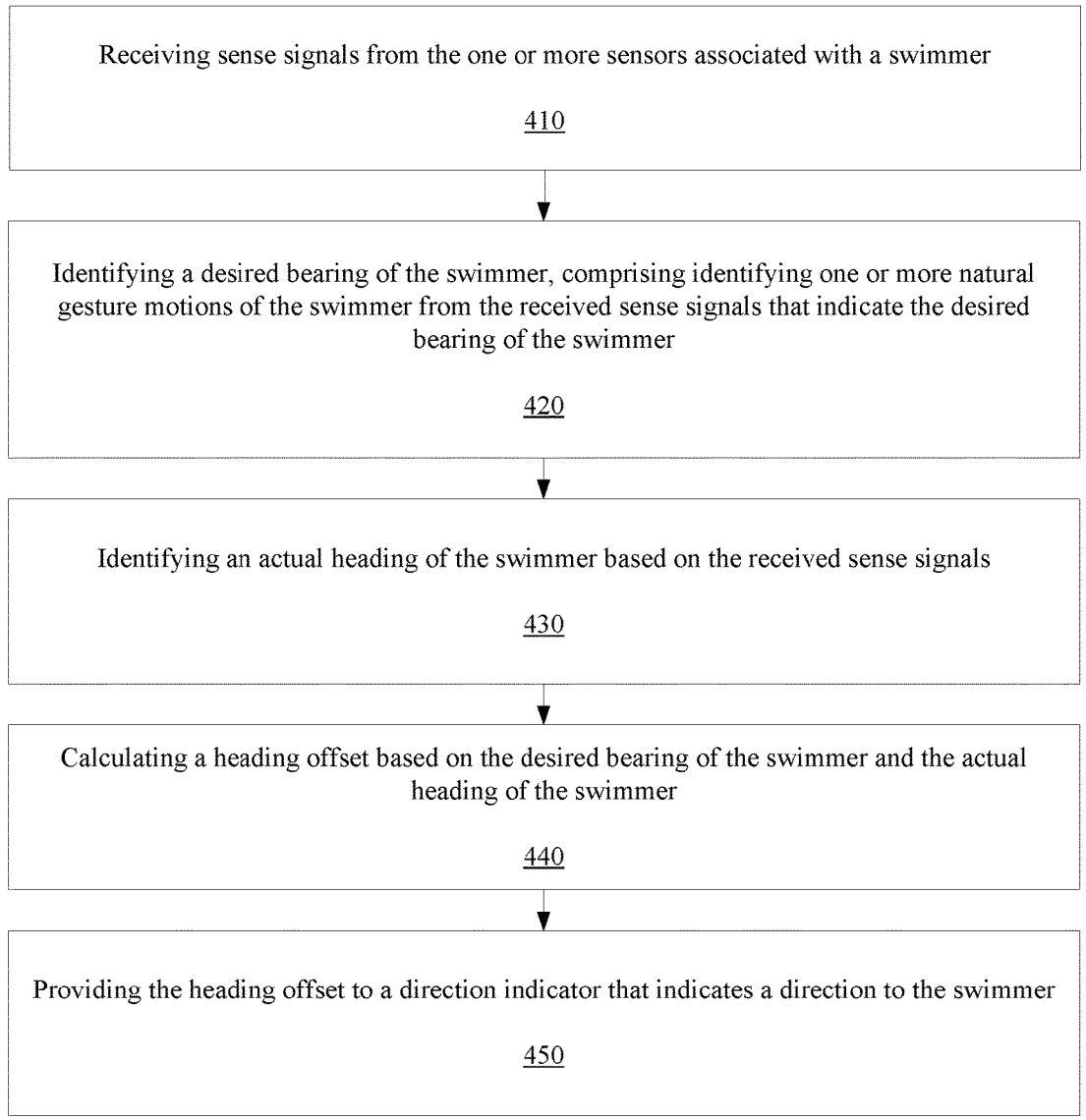
FIG. 4 is a flow chart that includes steps of a swim method, according to an embodiment.

FIG. 4 is a flow chart that includes steps of a swim method, according to an embodiment. A first step 410 includes receiving sense signals from the one or more sensors associated with a swimmer. A second step 420 includes identifying a desired bearing of the swimmer, comprising identifying one or more natural gesture motions of the swimmer from the received sense signals that indicate the desired bearing of the swimmer. A third step 430 includes identifying an actual heading of the swimmer based on the received sense signals. A fourth step 440 includes calculating a heading offset based on the desired bearing of the swimmer and the actual heading of the swimmer. A fifth step 450 includes providing the heading offset to a direction indicator that indicates a direction to the swimmer.

As previously described, for at least some embodiments, identifying the desired bearing of the swimmer includes sensing motion gestures of the swimmer that are repeatedly performed by the swimmer when the swimmer is determining the desired bearing.

As previously described, for at least some embodiments, identifying one or more natural gesture motions of the swimmer from the received sense signals that indicate the desired bearing of the swimmer includes sensing a head of the swimmer has been raised more than a threshold, indicating that at least one eye of the swimmer has been raised out of water the swimmer is swimming in, sensing the head of the swimmer has rotated towards a position directed towards the desired heading of the swimmer, and sensing the head of the swimmer has been lowered back down by the threshold, indicating the head of the swimmer is directed towards the desired heading.

As previously described, for at least some embodiments, identifying one or more natural gesture motions of the swimmer from the received sense signals that indicate the desired bearing of the swimmer includes sensing a position of a head of the swimmer relative to a horizontal plan of Earth while the swimmer is actively swimming. Further, a positive change in a pitch of the head of the swimmer relative to the horizontal plane of Earth is sensed of greater than a threshold indicating that the head of the swimmer has been lifted. Further, an azimuth of a sighting direction of the head of the swimmer is sensed, including sensing an azimuth angle to the sighting direction of the swimmer with respect to a local horizontal plane of Earth. Further, a negative change in the pitch of the head of the swimmer is sensed of greater than the threshold indicating the head of the swimmer has been lowered. Finally, the azimuth angel of the sighting direction at a predefined pitch angle during the negative pitch angle excursion of the swimmers head is transferred to set the desired new bearing with the sighting direction of the head of the swimmer.

For at least some embodiments, the one or more sensors include at least one of an accelerometer a magnetometer or a gyroscope. For at least some embodiments, determining the horizontal plane of Earth includes at least one of sensing magnetic north of the Earth by one or more magnetic sensors, or sensing gravity of Earth by one or more accelerometers. However, as previously described, generally more accuracy in the determination can be achieved by increasing the number of available sensors.

For at least some embodiments, sensing changes in the pitch of the head of the swimmer includes at least sensing positive change in a pitch of the head of the swimmer relative to the horizontal plane of Earth by at least one of two or more accelerometers, or two or more magnetic sensors, or one or more gyroscopes. However, as previously described, generally more accuracy in the sensing can be achieved by increasing the number of available sensors.

For at least some embodiments, sensing changes in the azimuth of the sighting direction of the head of the swimmer includes sensing changes in the azimuth by at least three magnetic sensors and three accelerometers, or by at least three accelerometers and three gyroscopes.

As previously described, at least some embodiments further includes determining a level of choppiness of water the swimmer is swimming in, and adaptively adjusting the threshold based on the determined level of choppiness. The level of choppiness of the water can be determined by observing the sense signals of the available sensors over a period of time. Generally, natural swim motions of the swimmer are distinctly different than motions of the swimmer caused by the choppiness of the water. If the choppiness increases, the thresholds can be increased because the swimmer generally needs to raise his/her head higher to see over the choppiness of the water. Conversely, if the choppiness is lower, the swimmer will generally only need to raise his/her head a smaller amount.

Alternate or Additional Embodiments

Lap Counter

At least some embodiments include a lap counter. This feature is used to keep track of laps a swimmer swims in a swimming pool or swim circuit. This is accomplished by detecting heading direction changes greater than a predefined angle but probably something like 90 degrees to detect complete reversal (180 degrees) of direction. The Swim device can also record, display or annunciate any number of real-time data such as number of laps swum, laps to go in a programmed workout, lap time of last completed lap and average lap time.

An embodiment of the lap counter includes a full motion fused 3-axis magnetometer with 3-axis accelerometer and 3-axis gyroscope, or a 9-axis system. At least some embodiments also include magnetic anomaly rejection and compensations because the heavy use of steal rebar used in the construction of swimming pools greatly affects Earth's magnetic field detected by the magnetometer sensor. A 6-axis accel/gyro only system not preferred as it has too much drift for this application.

Tempo Training

At least some embodiments include tempo training, wherein the tempo training is a metronome signal for which the swimmer can use to synchronize and train their swim stroke rate. A short audible tick or tone is output to the speaker at a pace settable by the user. Setting the tick pace on the fly is accomplished by tapping on the device at different axes (directions) to increase and decrease the tempo. The new tempo setting is annunciated in spoken words through the speaker. At least some embodiments include an automatic synchronization feature. With this feature the swim device automatically detects the swimmer's first stoke at the beginning of their swim or just after completing a turn at one end of a pool lane and automatically synchronizes the first and subsequent tempo tones using the swimmers first stroke as the baseline starting point. At least some embodiments include tempo training profiles. This feature permits the swimmer to set a tempo profiles for entire workouts. The profile consists of potentially multiple tempo rate levels and ramp rates. The ramp rate is the rate for which the tempo rate increase or decrease to the next tempo rate level in the workout schedule.

Stroke Rate (SR), Strokes Per Length (SPL) and Swimming-Golf Score

At least some embodiments of the Swim device uses the motion sensor signals to detect the cyclic rate of the swimmer's body roll to compute SR. This data can be used in combination with other data and is accessible to the swimmer at periodic rates or instantly at the swimmer's prompting. Swimming Golf is a popular drill that is used to help a swimmer increase their efficiency. The score is calculated at fixed number of laps, typically two, or 50-yards or meters. The score is equal to the elapse time of the interval plus the number of strokes. Because the swim computer keeps track of both parameters the swimmer does not have to count their own stokes, keep track of elapse time or do the math, instead they can focus their attention on their form. At least some embodiments include a Cruising Stroke Rate (CSR) determination. The Swim device can compute two types of stroke rates. The first type is the most common and it is computed by dividing the gross number of strokes divided the overall time during a preset interval that may include one or multiple laps in a pool. This type is a standard stroke rate and inherently includes the time it takes the swimmer to turn around in the pool and the push-off time (which can include kicks and no actual arm stroke swimming). The second type is called cruising stroke rate (CSR) and does not include the turnaround or kick-off times. The swim comp accomplishes this by detecting the first stroke of the swimmer and times the next predefined number of strokes, which should be lower than the swimmers lowest possible number of strokes per length of pool so that the turnaround transition is not included in the calculation.

Swim-Golf Optimization Program

At least some embodiments of the swim device includes a special sequence that the swimmer can execute that will start by taking their baseline swimming-golf score. Once that is established the swimmer then proceeds with a succession of laps with the Swim device pacing their stroke with an audible tone. The pace rate starts with a rate that is a preset percentage above the stroke rate measured during the swimmer's initial baseline swimming golf scoring laps. At preset laps intervals (typically 2 laps), the pace rate is decreased. The golf score is given at the end of each interval. This continues for as long as the swimmer wants but will typically end when they notice that their swimming golf score starts to decrease. The program can also run in reverse, that is, with the pacing rate starting at a slow speed in the beginning and increasing at subsequent intervals.

Swim Speed Optimization Program

This program is similar to the swim-golf program above but with the goal of reducing lap interval time.

Workout Scheduler and Timer

With a special PC, phone, tablet or watch application, the user can upload custom workout schedules (or scripts) that they have written into the Swim device. The Swim device can playback the workout script during their swim workout calling out each step as the swimmer progresses through the workout. While the swimmer is working out the Swim device will gather and record performance data such as interval timing, lap counting, stroke counting and the like as well as prompting the swimmer when the end of one interval period ends and when to start the next. It can also give feedback to the swimmer their actual stroke rate, heart rate or other performance tracking parameter versus what is called out in the workout script for a particular interval. Writing workout scripts is performed on a PC, phone or tablet. It is then uploaded to the Swim device. The user uses simple text to describe the workouts; its distances, interval length and times, stroke rate and heart rate targets, stroke type, rests. Users, trainers and coaches can save libraries of scripts on their PC and Swim device devices for later recall and playback.

Additional Features that Include Additional Sensors

Heart Rate Monitor

One embodiment of the Swim device includes a heart rate monitor. This monitor uses an infra-red transmitter/receiver pair fashioned into a clip that is fastened to the swimmers ear lobe to detect heart beat pulses of blood vessels in the ear lobe. A program can be included that automatically adjusts stroke pacing to maintain a constant heart rate or heart rate profile during a workout session.

Water Speed

A GPS affixed to the Swim device that can detect water speed and is used to compute the swimmer's efficiency (speed/stroke rate).

Efficiency/Power Meter

This feature uses the swimmer's personal data such as weight, height and body fat percentage along with sensor data to compute the swimmer efficiency and power rate.

Although specific embodiments have been described and illustrated, the described embodiments are not to be limited to the specific forms or arrangements of parts so described and illustrated. The embodiments are limited only by the appended claims.

What is claimed:

1. A swim apparatus, comprising:
   one or more sensors sensing motion of a swimmer;
   a direction indicator for indicating a direction to the swimmer; and
   a controller, the controller operative to:
      receive sense signals from the one or more sensors;
      identify a desired bearing of the swimmer, comprising identifying one or more natural gesture motions of the swimmer from the received sense signals that indicate the desired bearing of the swimmer;
      identify an actual heading of the swimmer based on the received sense signals;
      calculate a heading offset based on the desired bearing of the swimmer and the actual heading of the swimmer; and
      provide the heading offset to the direction indicator.

2. The apparatus of claim 1, wherein identifying the desired bearing of the swimmer comprises sensing motion gestures of the swimmer that are repeatedly performed by the swimmer when the swimmer is determining the desired bearing.

3. The apparatus of claim 1, wherein identifying one or more natural gesture motions of the swimmer from the received sense signals that indicate the desired bearing of the swimmer comprises:
    sensing a head of the swimmer has been raised more than a threshold, indicating that at least one eye of the swimmer has been raised out of water the swimmer is swimming in;
    sensing the head of the swimmer has rotated towards a position directed towards the desired heading of the swimmer; and
    sensing the head of the swimmer has been lowered back down by the threshold, indicating the head of the swimmer is directed towards the desired heading.

4. The apparatus of claim 1, wherein identifying one or more natural gesture motions of the swimmer from the received sense signals that indicate the desired bearing of the swimmer comprises:
    sensing a position of a head of the swimmer relative to a horizontal plane of Earth while the swimmer is actively swimming;
    sensing a positive change in a pitch of the head of the swimmer relative to the horizontal plane of Earth of greater than a threshold indicating that the head of the swimmer has been lifted;
    sensing an azimuth of a sighting direction of the head of the swimmer comprising sensing an azimuth angle to the sighting direction of the swimmer with respect to the horizontal plane of Earth;
    sensing a negative change in the pitch of the head of the swimmer of greater than the threshold indicating the head of the swimmer has been lowered;
    transferring the azimuth angel of the sighting direction to set the desired bearing with the sighting direction of the head of the swimmer.

5. The apparatus of claim 4, wherein the one or more sensors include at least one of an accelerometer a magnetometer or a gyroscope.

6. The apparatus of claim 5, wherein determining the horizontal plane of Earth, comprising at least one of sensing magnetic north of the Earth by one or more magnetic sensors, or sensing gravity of Earth by one or more accelerometers.

7. The apparatus of claim 5, wherein sensing changes in the pitch of the head of the swimmer comprises at least sensing positive change in a pitch of the head of the swimmer relative to the horizontal plane of Earth by at least one of two or more accelerometers, or two or more magnetic sensors, or one or more gyroscopes.

8. The apparatus of claim 5, wherein sensing changes in the azimuth of the sighting direction of the head of the swimmer comprises sensing changes in the azimuth by at least three magnetic sensors and three accelerometers, or by at least three accelerometers and three gyroscopes.

9. The apparatus of claim 4, wherein the controller is further operative to determine a level of choppiness of water the swimmer is swimming in, and adaptively adjusting the threshold based on the determined level of choppiness.

10. A swim method, comprising:
    receiving sense signals from the one or more sensors associated with a swimmer;
    identifying a desired bearing of the swimmer, comprising
        identifying one or more natural gesture motions of the swimmer from the received sense signals that indicate the desired bearing of the swimmer;
    identifying an actual heading of the swimmer based on the received sense signals;
    calculating a heading offset based on the desired bearing of the swimmer and the actual heading of the swimmer; and
    providing the heading offset to a direction indicator that indicates a direction to the swimmer.

11. The method of claim 10, wherein identifying the desired bearing of the swimmer comprises sensing motion gestures of the swimmer that are repeatedly performed by the swimmer when the swimmer is determining the desired bearing.

12. The method of claim 10, wherein identifying one or more natural gesture motions of the swimmer from the received sense signals that indicate the desired bearing of the swimmer comprises:
    sensing a head of the swimmer has been raised more than a threshold, indicating that at least one eye of the swimmer has been raised out of water the swimmer is swimming in;
    sensing the head of the swimmer has rotated towards a position directed towards the desired heading of the swimmer; and
    sensing the head of the swimmer has been lowered back down by the threshold, indicating the head of the swimmer is directed towards the desired heading.

13. The method of claim 10, wherein identifying one or more natural gesture motions of the swimmer from the received sense signals that indicate the desired bearing of the swimmer comprises:
    sensing a position of a head of the swimmer relative to a horizontal plan of Earth while the swimmer is actively swimming;
    sensing a positive change in a pitch of the head of the swimmer relative to the horizontal plane of Earth of greater than a threshold indicating that the head of the swimmer has been lifted;
    sensing an azimuth of a sighting direction of the head of the swimmer comprising sensing an azimuth angle to the sighting direction of the swimmer with respect to a local horizontal plane of Earth;
    sensing a negative change in the pitch of the head of the swimmer of greater than the threshold indicating the head of the swimmer has been lowered; and
    transferring the azimuth angel of the sighting direction at a predefined pitch angle during the negative pitch angle excursion of the swimmers head to set the desired new bearing with the sighting direction of the head of the swimmer.

14. The method of claim 13, wherein the one or more sensors include at least one of an accelerometer a magnetometer or a gyroscope.

15. The method of claim 14, determining the horizontal plane of Earth, comprising at least one of sensing magnetic north of the Earth by one or more magnetic sensors, or sensing gravity of Earth by one or more accelerometers.

16. The method of claim 14, wherein sensing changes in the pitch of the head of the swimmer comprises at least sensing positive change in a pitch of the head of the swimmer relative to the horizontal plane of Earth by at least one of two or more accelerometers, or two or more magnetic sensors, or one or more gyroscopes.

17. The method of claim 14, wherein sensing changes in the azimuth of the sighting direction of the head of the swimmer comprises sensing changes in the azimuth by at least three magnetic sensors and three accelerometers, or by at least three accelerometers and three gyroscopes.

18. The method of claim 10, further comprising determining a level of choppiness of water the swimmer is swimming in, and adaptively adjusting the threshold based on the determined level of choppiness.

* * * * *